(12) United States Patent
Numata et al.

(10) Patent No.: US 11,381,455 B2
(45) Date of Patent: *Jul. 5, 2022

(54) INFORMATION SYSTEM, CONTROL SERVER, VIRTUAL NETWORK MANAGEMENT METHOD, AND PROGRAM

(71) Applicant: NEC Corporation, Tokyo (JP)

(72) Inventors: Masashi Numata, Tokyo (JP); Syuuhei Yamaguchi, Tokyo (JP); Junichi Yamato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,466

(22) Filed: Sep. 8, 2017

(65) Prior Publication Data

US 2018/0013626 A1 Jan. 11, 2018

Related U.S. Application Data

(63) Continuation of application No. 14/825,406, filed on Aug. 13, 2015, now Pat. No. 9,794,124, which is a (Continued)

(30) Foreign Application Priority Data

Oct. 7, 2009 (JP) .............................. JP2009-233895

(51) Int. Cl.
*H04L 12/24* (2006.01)
*H04L 41/0853* (2022.01)
(Continued)

(52) U.S. Cl.
CPC ...... *H04L 41/0856* (2013.01); *H04L 12/4641* (2013.01); *H04L 45/00* (2013.01);
(Continued)

(58) Field of Classification Search
CPC . H04L 41/0856; H04L 12/4641; H04L 45/42; H04L 45/00; H04L 45/64; H04L 45/38
See application file for complete search history.

(56) References Cited

U.S. PATENT DOCUMENTS 7,133,407 B2 11/2006 Jinzaki et al.
7,286,535 B2 10/2007 Ishikawa et al.
(Continued)

FOREIGN PATENT DOCUMENTS

EP 1 164 754 12/2001
JP 2002-077266 3/2002
(Continued)

OTHER PUBLICATIONS

Kazuto ASO, "A Virtual Router that Changes IP Services, a Configuration of users Environment for each user, which is Implemented in Various Products by Various Vender", Nikkei Communication, Nikkei BP, Apr. 15, 2002, No. 364, p. 78-80.
(Continued)

*Primary Examiner* — Walli Z Butt
(74) *Attorney, Agent, or Firm* — Sughrue Mion, PLLC

(57) ABSTRACT

A control apparatus, includes a first unit configured to be capable of specifying an identification rule to identify a packet based on a user of a virtual network including a plurality of virtual nodes; and a second unit configured to be capable of sending an instruction to a physical node corresponding to each of the virtual nodes of the virtual network, wherein each of the virtual nodes includes a predetermined network function being capable of providing a first packet operation to the packet, wherein the instruction includes that the physical node provides a second packet operation to the packet so as to emulate the first packet operation.

18 Claims, 17 Drawing Sheets

Related U.S. Application Data continuation of application No. 13/500,564, filed as application No. PCT/JP2010/067640 on Oct. 7, 2010, now Pat. No. 9,148,342.

(51) Int. Cl.
*H04L 12/46* (2006.01)
*H04L 45/00* (2022.01)
*H04L 45/42* (2022.01)
*H04L 45/64* (2022.01)

(52) U.S. Cl.
CPC .............. *H04L 45/42* (2013.01); *H04L 45/38* (2013.01); *H04L 45/64* (2013.01)

(56) References Cited

U.S. PATENT DOCUMENTS

| | | | |
|---|---|---|---|
| 7,339,929 | B2 | 3/2008 | Zelig et al. |
| 7,545,829 | B2 | 6/2009 | Shimazaki et al. |
| 7,684,382 | B2 | 3/2010 | Ishii et al. |
| 7,773,600 | B2 | 8/2010 | Ishikawa et al. |
| 8,644,188 | B1 * | 2/2014 | Brandwine .............. H04L 45/00 370/254 |
| 9,148,342 | B2 * | 9/2015 | Numata .............. H04L 41/0856 |
| 9,794,124 | B2 * | 10/2017 | Numata .............. H04L 41/0856 |
| 2001/0016914 | A1 | 8/2001 | Tabata |
| 2003/0037165 | A1 | 2/2003 | Shinomiya |
| 2003/0162499 | A1 | 8/2003 | Johsson |
| 2003/0169747 | A1 | 9/2003 | Wang |
| 2003/0189932 | A1 | 10/2003 | Ishikawa et al. |
| 2003/0200295 | A1 | 10/2003 | Roberts et al. |
| 2004/0059831 | A1 | 3/2004 | Chu |
| 2004/0210623 | A1 | 10/2004 | Hydrie et al. |
| 2004/0215630 | A1 | 10/2004 | Parekh et al. |
| 2006/0029087 | A1 | 2/2006 | Ooi |
| 2006/0041580 | A1 | 2/2006 | Ozdemir et al. |
| 2006/0056384 | A1 | 3/2006 | Ishii et al. |
| 2007/0153700 | A1 | 7/2007 | Spalink et al. |
| 2007/0294377 | A1 | 12/2007 | Ho et al. |
| 2008/0037546 | A1 | 2/2008 | Ishikawa et al. |
| 2008/0307519 | A1 | 12/2008 | Curcio et al. |
| 2009/0138577 | A1 | 5/2009 | Casado et al. |
| 2009/0248846 | A1 | 10/2009 | Cohn |
| 2010/0107162 | A1 * | 4/2010 | Edwards ............... G06F 9/5077 718/1 |
| 2010/0169880 | A1 | 7/2010 | Haviv et al. |
| 2010/0257263 | A1 * | 10/2010 | Casado ................... H04L 41/12 718/1 |
| 2010/0293544 | A1 | 11/2010 | Wilson et al. |
| 2011/0176549 | A1 | 7/2011 | Wu et al. |
| 2012/0257496 | A1 | 10/2012 | Lattmann et al. |

FOREIGN PATENT DOCUMENTS

| | | |
|---|---|---|
| JP | 2002-252631 | 9/2002 |
| JP | 2002-325090 | 11/2002 |
| JP | 2003-023444 | 1/2003 |
| JP | 2003-304278 | 10/2003 |
| JP | 2003-318949 | 11/2003 |
| JP | 2004-272905 | 9/2004 |
| JP | 2005-051648 | 2/2005 |
| JP | 2006-086889 | 3/2006 |
| JP | 2007-525728 | 9/2007 |
| JP | 2008-306725 | 12/2008 |
| JP | 2009-135805 | 6/2009 |

OTHER PUBLICATIONS

Japanese Office Action dated Dec. 2, 2014 with a partial English translation.
International Search Report in PCT/JP2010/067640 dated Jan. 18, 2011 (English Translation Thereof).
McKeown, Nick et al., "OpenFlow: Enabling Innovation in Campus Networks," [online], searched on Jul. 17, 2009], Internet < URL : http://www.openflowswitch.org//documents/openflow-wplatest.pdf>.
European Search Report dated Mar. 6, 2013.
Peter Sjodin, et al., "Network Visualization Based on Flows", Jun. 9, 2009 (Jun. 9, 2009), pp. 1-17, XP055053941, Terena Networking Conference 2009 Retrieved from the Internet: URL:http//www.fp7-federica.eu/documents/FEDERICA Sjodin pre malaga_06209.pdf [retrieved on Feb. 191, 2013].
Farrel Old Dog Consulting J-P Vasseur Cisco Systems A et al., "A Path Computation Element (PCE)-Based Architecture; rfc4655.txt", 20060801. Aug. 1, 2006 (Aug. 1, 2006), XP015047407, ISSN: 0000-0003.
Mehrdad Dianati et al., "Enabling Tussle-Agile Inter-networking Architectures by Underlay Virtualisation", Sep. 1, 2009 (Sep. 1, 2009), Future Internet—FIS 2009, Springer Berlin Heidelberg, Berlin, Heidelberg, pp. 81-95, XP019148359, ISBN: 978-3-642-14955-9.
Japanese Office Action dated Sep. 29, 2016, with an English translation.
Saurav Das, et al., "Simple Unified Control for Packet and Circuit Networks", IEEE/LEOS Summer Tropical Meeting. 2009 (LEOSST'09), pp. 147-148, Jul. 2009, IEEE, URL:http://ieeexplore.ieee.org/xpls/abs all.jsp?arnumber=5226211.
Nick Mckeown, "Software-defined Networking", Apr. 2009. URL://www.cs.rutgers.edu/-badri/552dir/papers/into/nick09.pdf.
Decision on Appeal, Trial Case No. Fufuku-2016-4314, Appeal Against an Examiner's Decision of Rejection to Application No. 2014-043134), dated May 9, 2017, pp. 1-25.
OpenFlow Switch Specification Version 0.9.0 (Wire Protocol 0x98), Jul. 20, 2009, pp. 1-36.
OpenFlow Switch Specification Obtained http://www.openflowswitch.org (last accessed on Jun. 26, 2017).
Gregor Schaffrath et al, "Network Virtualization Architecture: Proposal and Initial Prototype", Aug. 17, 2009, pp. 63-72. XP058378881.
Extended European Search Report dated Aug. 5, 2020, issued by the European Patent Office in counterpart European Patent Application No. 20170730.4.

* cited by examiner

FIG. 6

| KEY | VALUE |
|---|---|
| VIRTUAL NODE ID | OBJECT ID |
| ... | ... |

FIG. 7

(a) ROUTING TABLE

| KEY | VALUE |
|---|---|
| IP SUBNET/MASK | VIRTUAL INTERFACE ID, NEXT HOP |
| ... | ... |

(b) ARP TABLE

| KEY | VALUE |
|---|---|
| MAC | IP ADDRESS |
| ... | ... |

(c) ROUTER SETTING INFORMATION

| VALUE |
|---|
| ROUTER'S MAC ADDRESS |

FIG. 8

| KEY | VALUE |
|---|---|
| NODE_ID:#1, VIRTUAL I/F_ID:#10 | NODE_ID:#2, VIRTUAL I/F_ID:#20 |
| .. | .. |
| NODE_ID:#2, VIRTUAL I/F_ID:#30 | EXTERNAL NODE |
| .. | .. |

FIG. 10

| KEY | VALUE |
|---|---|
| PHYSICAL NODE ID, PHYSICAL PORT ID, HEADER INFORMATION (mac(src/dst), vlan-tag, ip(src/dst), L4port(src/dst)) | VIRTUAL NETWORK ID, VIRTUAL NODE ID, VIRTUAL INTERFACE ID |
| . . | . . |

FIG. 11

| KEY | VALUE |
|---|---|
| PHYSICAL NODE IP ADDRESS | PHYSICAL SWITCH ID |
| ... | ... |

FIG. 12

| KEY | VALUE |
|---|---|
| MATCHING KEY | ACTION |
| : : | : : |

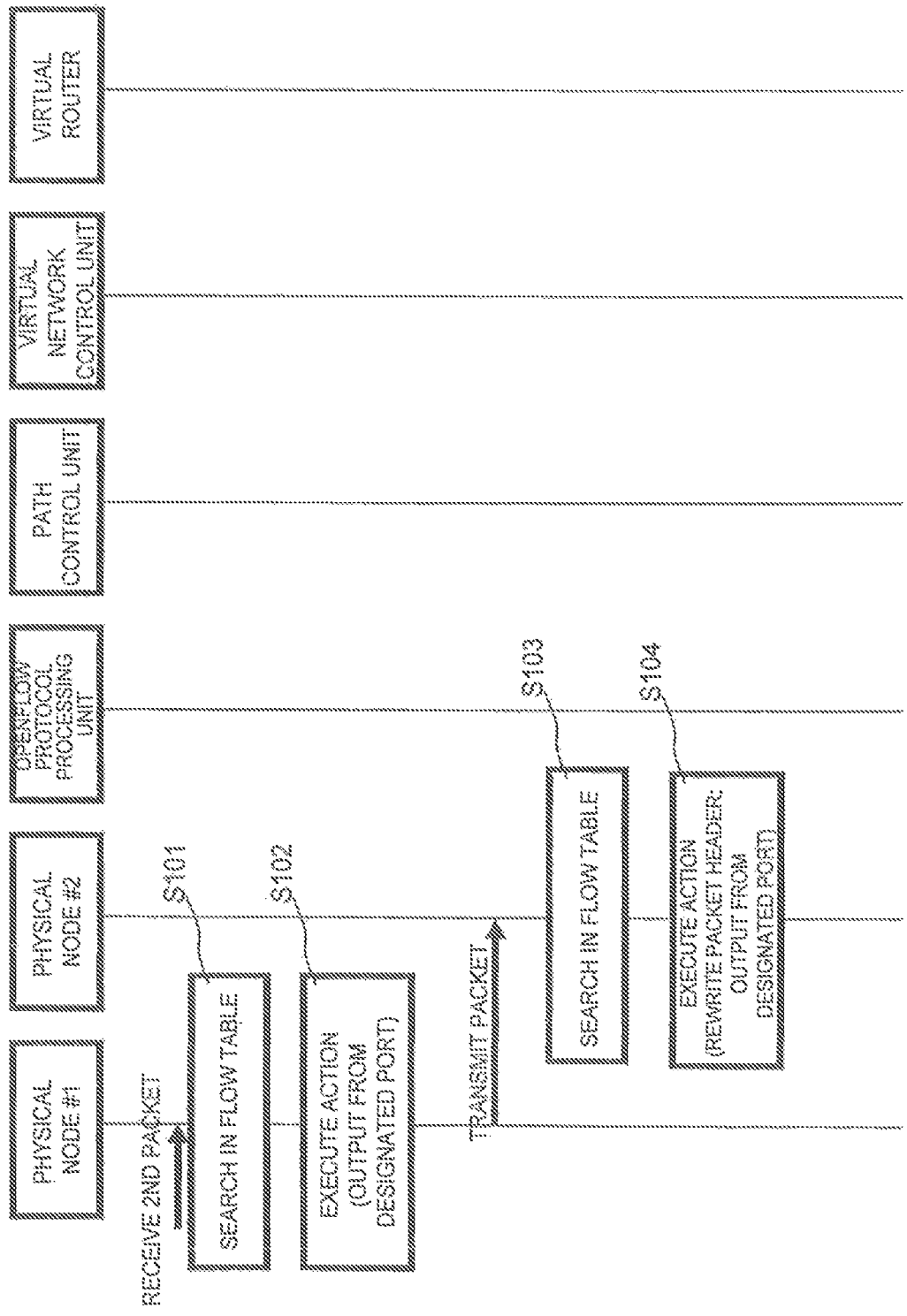

INFORMATION SYSTEM, CONTROL SERVER, VIRTUAL NETWORK MANAGEMENT METHOD, AND PROGRAM

This application is a continuation of U.S. patent application Ser. No. 14/825,406, filed Aug. 13, 2015, which is a continuation of U.S. patent application Ser. No. 13/500,564, filed Apr. 5, 2012, which is a National Stage entry of PCT/JP2010/067640, which was filed on Oct. 7, 2010, which claims priority to Japanese Patent Application No. JP 2009-233895. The entire contents of the above-referenced applications are expressly incorporated herein by reference.

FIELD OF THE INVENTION

Reference to Related Application

The present invention is based upon and claims the benefit of the priority of Japanese patent application No. 2009-233895 filed on Oct. 7, 2009, the disclosure of which is incorporated herein in its entirety by reference thereto.

The present invention relates to an information system, control server, virtual network management method, and program, and particularly to an information system, control server, virtual network management method, and program providing a virtual network.

Background of the Invention

Patent Document 1 discloses a virtual network constructing device that realizes end-to-end security for each service, security between services at a client, and scalability for a large-scale system. According to this document, when a client selects an available service in launcher software transmitted from a path control server after the client's authentication request has been accepted, a corresponding path constructing request is transmitted to the path control server. The path control server issues the client an instruction for connecting to a base router, and also issues the base router an instruction for connecting to the client. The document recites that an in-base VLAN can be dynamically constructed between the client and the base router as a result.

Patent Document 2 discloses a system for managing customers in a hierarchical manner. Further, Patent Document 3 discloses a peer-to-peer network capable of providing a new network topology.

Non-Patent Document 1 proposes a technology called OpenFlow. OpenFlow treats communication as art end-to-end flow, and performs path control, failure recovery, load balancing, and optimization for each flow. An OpenFlow switch that functions as a forwarding node operates according to a flow table appended or updated by an OpenFlow controller according to OpenFlow protocol. In the flow table, pairs of a packet matching rule that specify a packet and an action such as outputting the packet to a specific port, discarding it, or rewriting a header are registered as flow entries. When there is a corresponding entry, the OpenFlow switch processes a received packet according to an action written in the entry, and notifies the OpenFlow protocol of the reception of the packet when there is no corresponding entry.

PRIOR ART DOCUMENTS

Patent Documents

[Patent Document 1] Japanese Patent Kokai Publication No. JP-P2009-135805A
[Patent Document 2] Japanese Patent Kohyo Publication No. JP-P2007-525728A
[Parent Document 3] Japanese Patent Kokai Publication No. JP-P2008-306725A
[Non-Patent Document 1] McKeown, Nick et al., "OpenFlow: Enabling Innovation in Campus Networks," [on-line], [searched on Jul. 17, 2009], Internet<URL: http://www.openflowswitch.org//docurments/openflow-wp-latest.pdf>

SUMMARY OF THE DISCLOSURE

Problems to be Solved by the Invention

The entire disclosures of Patent Documents 1 to 3 and Non-Patent Document 1 are incorporated herein in their entirety by reference thereto.
The following analysis is given by the present invention.
The technologies of Patent Documents 1 to 3 logically divide a network, however, they do not perform detailed path control by determining a policy for each flow. Further, a method such as source routing can be used to perform path control, but the net data amount a packet can contain gets reduced in this case.

Regarding this point, Non-Patent Document 1 proposes a configuration in which path control is performed by the OpenFlow switch operating based on the flow table that defines an action for each flow, but the document only discusses network management, access control, and construction of a virtual network by virtualizing the OpenFlow switch as concrete examples of applications of this configuration.

The present invention has been made in considering the above circumstances, and it is an object thereof to provide a configuration capable of configuring a virtual network by virtualizing a physical network and achieving finely tuned path control in the virtual network.

Mean to Solve the Problems

According to a first aspect of the present invention, there is provided an information system, comprising: a plurality of physical nodes that hold control information defining an operation corresponding to the characteristics of an input/output packet(s) and that perform processing on an input/output packet(s) according to the control information; a first storage unit that stores configuration information of a virtual network including a virtual node configured using at least one of the physical nodes; a second storage unit that stores virtual network identifying information identifying the virtual network from characteristics of an input packet; and a control server that identifies a physical node configuring a virtual network that handles a packet having a characteristic in common with a packet received by the physical node based on a request from she physical node and that updates control information for each of the physical nodes.

According to a second aspect of the present invention, there is provided a control server, connected to a plurality of physical nodes that hold control information defining an operation corresponding to characteristics of an input/output packet(s) and that perform processing on an input/output packet(s) according to the control information, comprising: a first storage unit, that stores configuration information of a virtual network including a virtual node configured using at least one of the physical nodes; a second storage unit that stores virtual network identifying information identifying the virtual network from characteristics of an input packet;

and a control unit that identifies a physical node(s) configuring a virtual network that handles a packet having a characteristic in common with a packet received by the physical node based on a request from the physical node and that updates control information for each of the physical nodes.

According to a third aspect of the present invention, there is provided a virtual network management method executed by a control server connected to a plurality of physical nodes that hold control information defining an operation corresponding to characteristics of an input/output packet(s) and that perform processing on an input/output packet(s) according to the control information. The virtual network management method comprises a step of having the control server identify a physical node(s) configuring a virtual network that handles a packet having a characteristic in common with a packet received by the physical node(s) based on a request from the physical node(s) by referring to a first storage unit that stores configuration information of a virtual network including a virtual node configured using at least one of the physical nodes and to a second storage unit that stores virtual network identifying information identifying the virtual network from the characteristics of an input packet; and a step of updating control information for each of the identified physical nodes. This method is tied to the control server, a specific machine connected to the physical nodes and updating the control information thereof.

According to a fourth aspect of the present invention, there is provided a program, executed by a computer configuring a control server connected to a plurality of physical nodes that hold control information defining an operation corresponding to characteristics of an input/output packet(s) and that perform processing on an input/output packet(s) according to the control information, having the computer execute a process of having the control server identify a physical node(s) configuring a virtual network that handles a packet having a characteristic in common with a packet received by the physical node(s) based on a request from the physical node(s) by referring to a first storage unit that stores configuration information of a virtual network including a virtual node(s) configured using at least one of the physical nodes and to a second storage unit that stores virtual network identifying information identifying the virtual network from the characteristics of an input packet; and a process of updating control information for each of the identified physical nodes. Note that this program may be stored in a storage medium readable by a computer. In other words, the present invention can be embodied as a computer program product.

Effect of the Invention

According to the present invention, it becomes possible to perform path control according to the characteristics of a packet on a configured virtual network. Further, high-speed processing can be achieved since no inquiry to the control server is necessary after the control information has been updated and each physical node does not have to refer to a routing table.

BRIEF DESCRIPTION OF THE DRAWINGS

FIG. 6 is an example of a virtual node table held by the control server of the first exemplary embodiment of the present invention.
FIG. 7 is an example of setting information of a virtual node held by the control server of the first exemplary embodiment of the present invention.
FIG. 8 is an example of virtual network configuration information held by the control server of the first exemplary embodiment of the present invention.
FIG. 10 is an example of virtual network identifying information held by the control server of the first exemplary embodiment of the present invention.
FIG. 11 is an example of management switch information held by the control server of the first exemplary embodiment of the present invention.
FIG. 12 is an example of a flow entry held by the control server of the first exemplary embodiment of the present invention.
FIG. 17 is a sequence diagram for explaining the operation of the first exemplary embodiment of the present invention.

MODES FOR CARRYING OUT THE INVENTION

Figure 1:
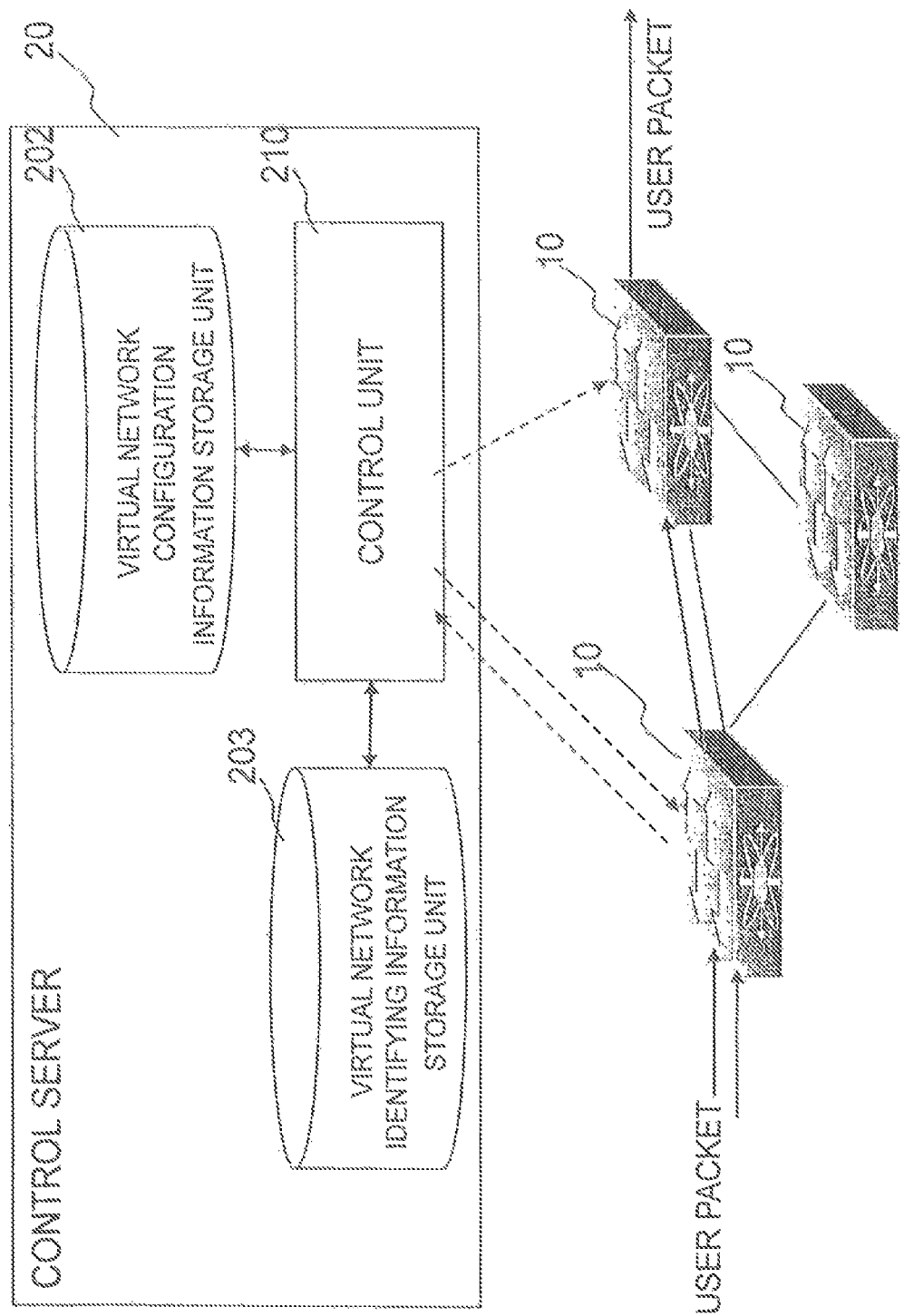
FIG. 1 is a drawing for explaining an outline of the present invention.

First, an outline of the present invention will be given with reference to the drawings. As shown in FIG. 1, the present invention can be realized by a plurality of physical nodes 10 that hold control information defining actions according to characteristics of input/output packet(s) and that process the input/output packets according to the control information and a control server 20 that comprises a function of updating the control information of the physical nodes 10.

The control sever 20 comprises a first storage unit (virtual network configuration information storage unit) 202 that stores configuration information of a virtual network comprised of virtual nodes which are virtualized versions of the physical nodes 10; a second storage unit (virtual network identifying information storage unit) 203 that stores virtual network identifying information that identifies the virtual network from the characteristics of the input packet(s); and a control unit 210 that identifies a physical node(s) configuring a virtual network that handles a packet(s) having a characteristic in common with the packet(s) received by the physical node(s) and that updates control information for each of physical nodes 10 based on a request from the physical node 10 concerned.

The physical node 10 can be realized by a switch equivalent to the OpenFlow switch of Non-Patent Document 1 that operates according to the flow table or a router, and notifies the control server 20 that a packet not in the flow table is received upon reception of the packet (request for creating a flow entry; an arrow from the physical node 10 to the control unit 210 in FIG. 1).

Upon receiving the request for creating a flow entry, the control server 20 refers to the second storage unit 203 and identifies a virtual network to which the packet concerned should belong from the characteristics (port number, physical node ID, and header information) of the input packet. Next, the control server 20 refers to the first storage unit 202, suitably performs forwarding processing on the received packet within the virtual network, identifies a physical node or nodes corresponding to the identified virtual network, and updates the control information of the identified physical node or nodes (arrows from the control unit 210 to the physical nodes 10 in FIG. 1). As described, subsequent packets are successively forwarded by the physical nodes according to the control information updated for each virtual network.

Further, the control server 20 can be realized by adding the functions relating to the virtual network described above to the OpenFlow controller of Non-Patent Document 1 as a base. Or it is also possible to realize the control server 20 by having another server that provides the functions relating to the virtual network described above work together with the OpenFlow controller of Non-Patent Document 1.

First Exemplary Embodiment

Figure 2:
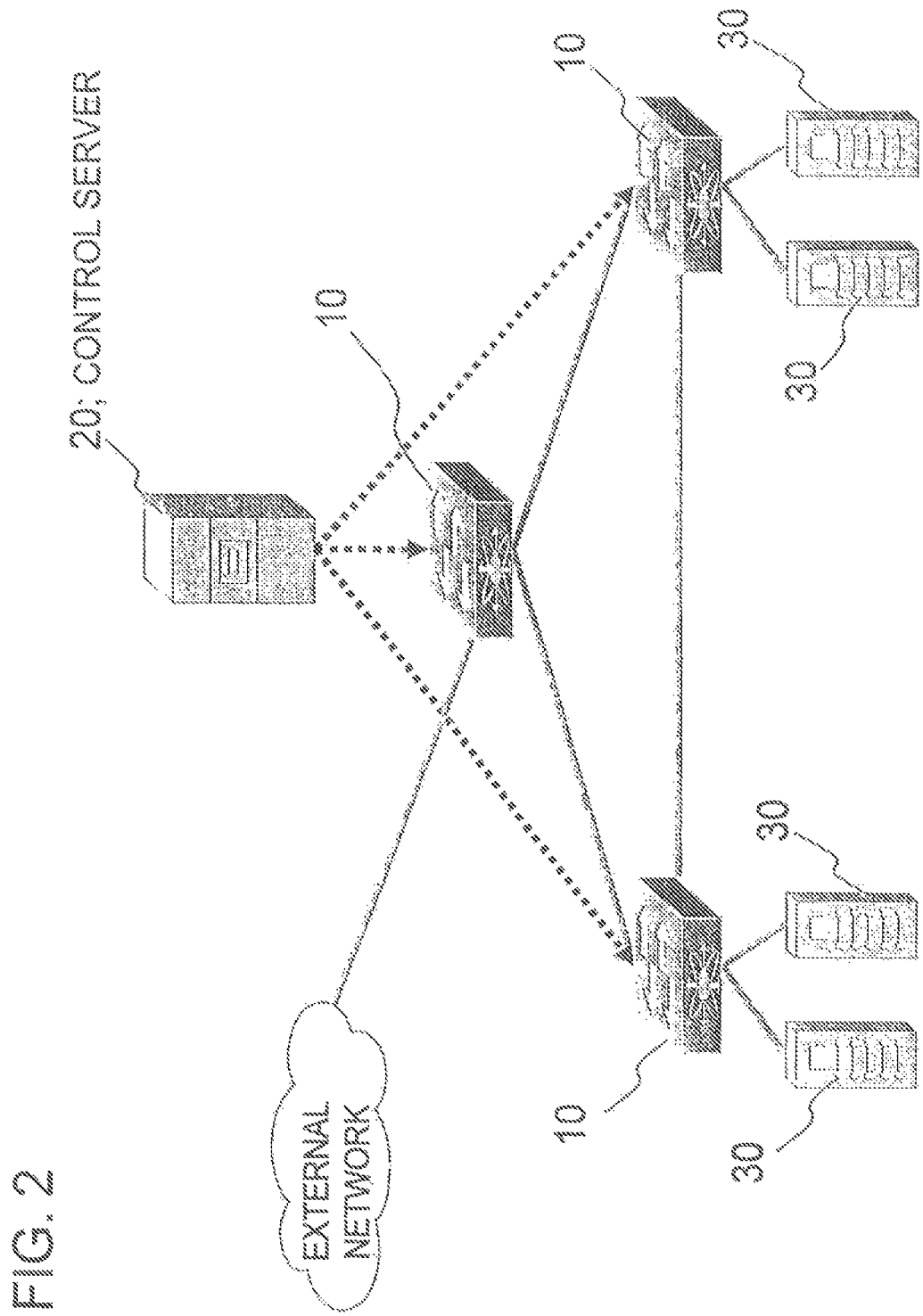
FIG. 2 is a drawing showing the configuration of a first exemplary embodiment of the present invention.

Next, a first exemplary embodiment of the present invention will be described in detail with reference to the drawings. FIG. 2 is a drawing showing the configuration of the first exemplary embodiment of the present invention. With reference to FIG. 2, a plurality of physical nodes 10, the control server 20, and external nodes 30 are shown.

The physical nodes 10 are connected each other and it is configured by a switch or router that forwards a packet(s) sent/received to/from the external network 30. In the present exemplary embodiment, the physical node 10 is assumed to be an OpenFlow switch.

The control server 20 is connected to the physical nodes 10 via secure channels and instructs the physical nodes 10 to update the control information. In the present exemplary embodiment, the control server 20 is assumed to be a server that comprises a function as the OpenFlow controller communicating with the physical nodes 10 using the OpenFlow protocol.

The external node(s) 30 is configured by a server(s) that provides various services to a user terminal accessing from the external network. In the present exemplary embodiment, the external node 30 is assumed to be an Http (Hyper-Text Transfer Protocol) server.

Figure 3:
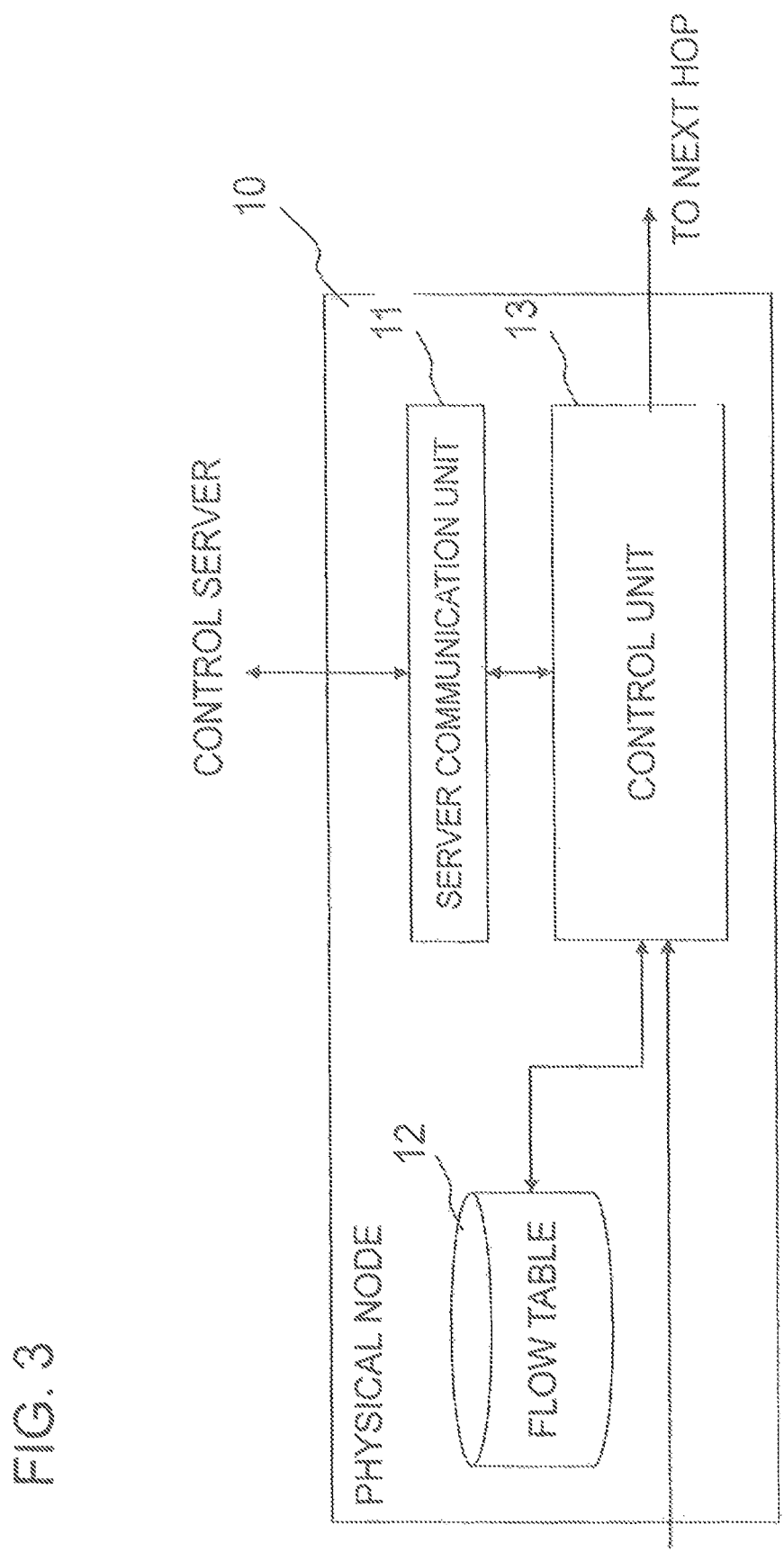
FIG. 3 is a drawing showing a detailed configuration of a physical node of the first exemplary embodiment of the present invention.

FIG. 3 is a drawing showing a detailed configuration of the physical node of the first exemplary embodiment of the present invention. With reference to FIG. 3, the physical node comprises a server communication unit 11 that communicates with the control server 20, a flow table 12, and a control unit 13. According to an instruction from the control server 20, the control unit 13 adds a new entry to the flow table 12, searches for an entry having a matching key that matches a received packet in the flow table 12, and executes a corresponding action.

Figure 4:
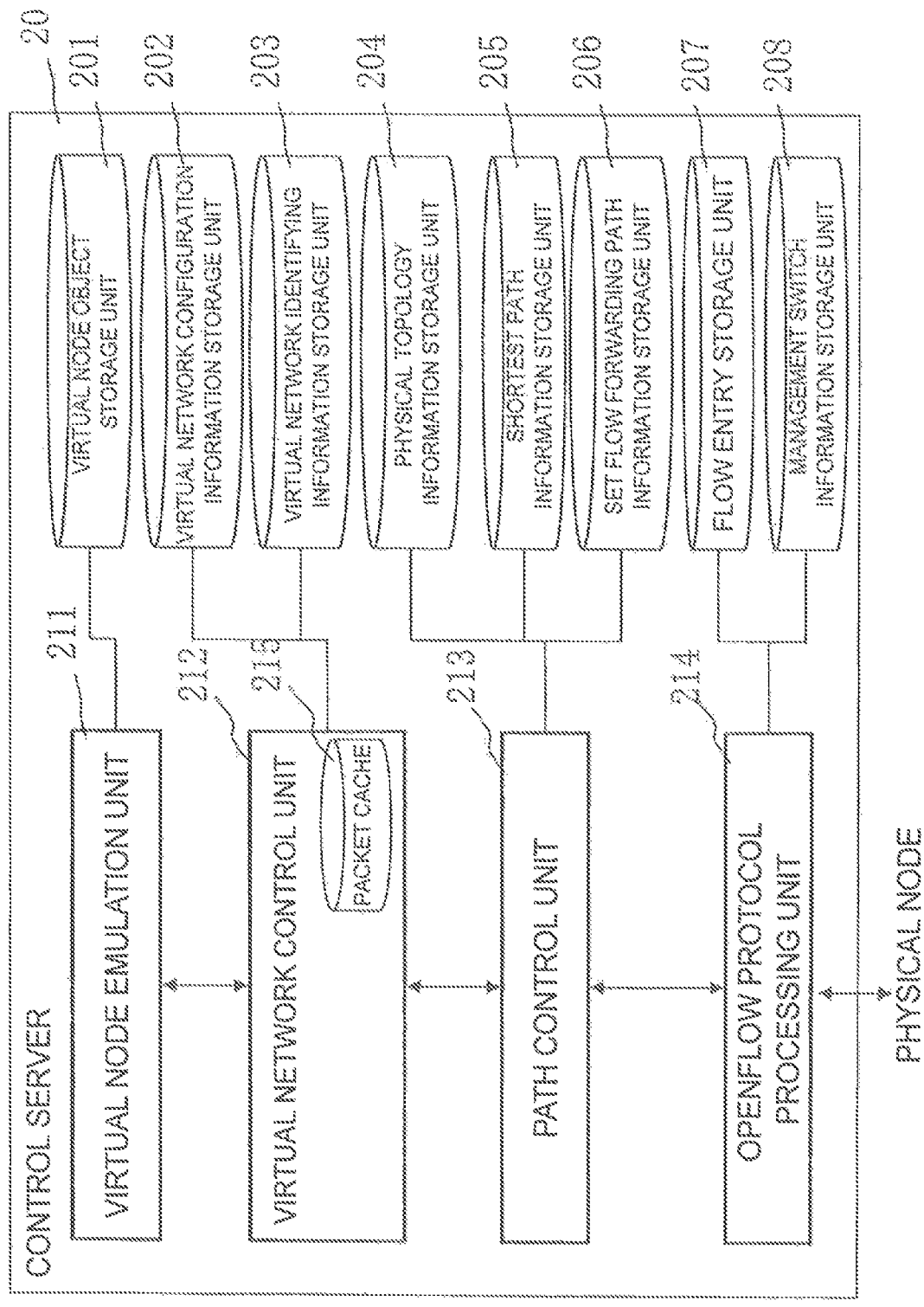
FIG. 4 is a drawing showing a detailed configuration of a control server of the first exemplary embodiment of the present invention.

FIG. 4 is a drawing showing a detailed configuration of the control server of the first exemplary embodiment of the present invention. With reference to FIG. 4, the control server 20 comprises a virtual node emulation unit 211, a virtual network control unit 212, a path control unit 213, an OpenFlow protocol processing unit 214, and a storage device that functions as a storage unit storing information discussed later.

In the example in FIG. 4, the control server 40 comprises a virtual node object storage unit 201, the virtual network configuration information storage unit 202, the virtual network identifying information storage unit 203, a physical topology information storage unit 204, a shortest path information storage unit 205, a set flow forwarding path information storage unit 206, a flow entry storage unit 207, and a management switch information storage unit 208 configured by the aforementioned storage device.

In the explanation below, it is assumed that the control server 20 constructs a virtual network configured by a layer 3 switch (L3SW), a firewall (FW), a load balancer (LB), and a layer 2 switch (L2SW) shown in FIG. 5.

Figure 6:
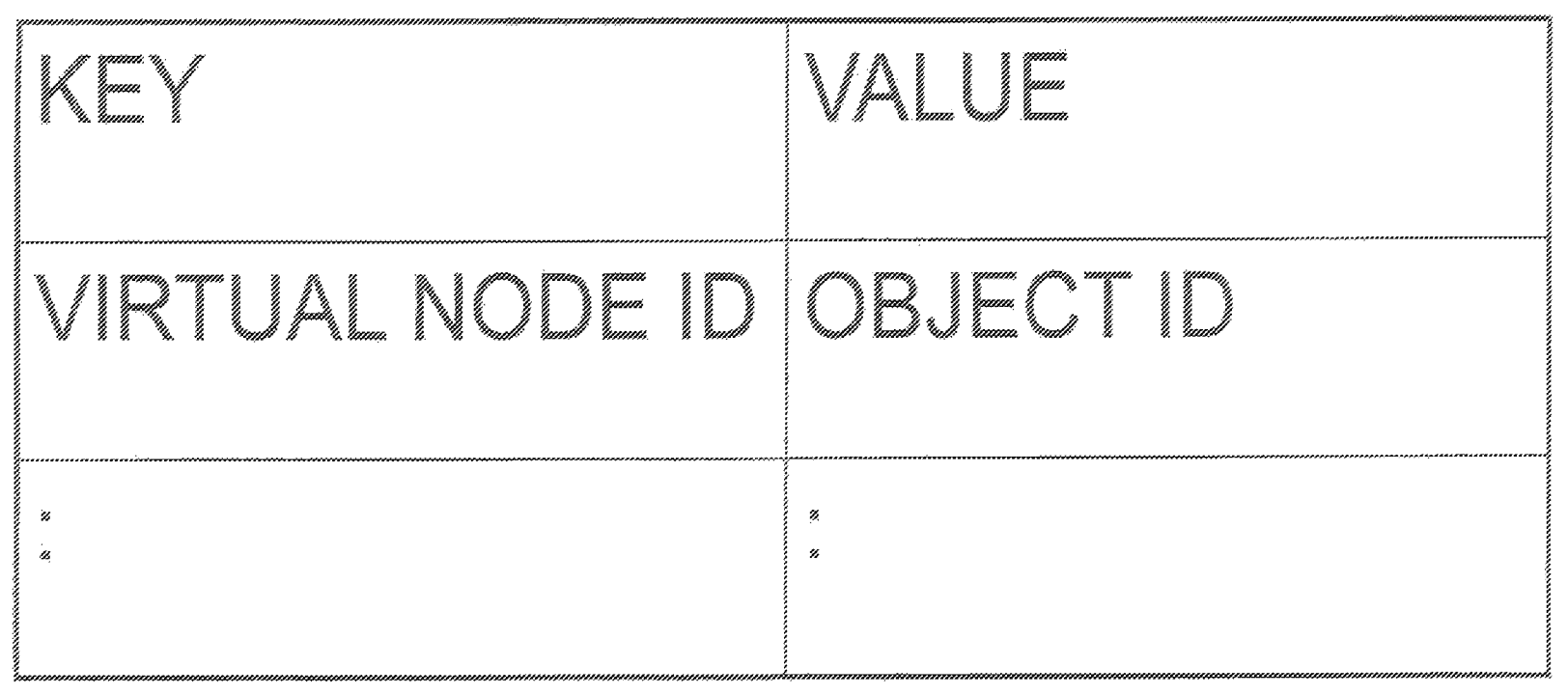

The virtual node emulation unit 211 performs processing as a virtual node using virtual objects having a class corresponding to the aforementioned L3SW, FW, LB, and L2SW stored in the virtual node object storage unit 201. For instance, each virtual object is identified by a virtual node table shown in FIG. 6 in which a virtual node ID on the virtual network is associated with an object ID.

FIG. 7 shows an example of setting information of a virtual router object stored in the virtual node object storage unit 201. The basic operation is the same as a normal physical router device. A destination is determined by referring to a routing table, and a MAC address is resolved by an ARP (Address Resolution Protocol) table and converted into a MAC address of a router of the source MAC address. What is different from a router device on a real network is that a virtual interface ID is stored in the routing table and the virtual interface ID is resolved as the destination. Therefore, upon receiving a packet specifying the virtual router as a virtual node ID from the virtual network control unit 212, the virtual node emulation unit 211 performs processing as a router on the virtual network and outputs a converted packet of a virtual interface ID and destination MAC address.

The setting of the virtual node shown in FIG. 7 can be changed by a user authorized to use the virtual network. Meanwhile, an association between the physical node and the virtual network discussed later is hidden from the user, and he can utilize the virtual node on the virtual network in the same way as a physical node.

The virtual network control unit 212 performs input/output of packet information from/to the virtual node emulation unit 211 according to an association between the configuration information of the virtual network stored in the virtual network configuration information storage unit 202 and the virtual network identifying information storage unit 203 and the real network thereof. Further, the virtual network control unit 212 temporarily stores the received packet in a packet cache 215 and creates conversion contents of a packet header to be instructed to a physical node to which the packet is ultimately outputted.

Figure 9:
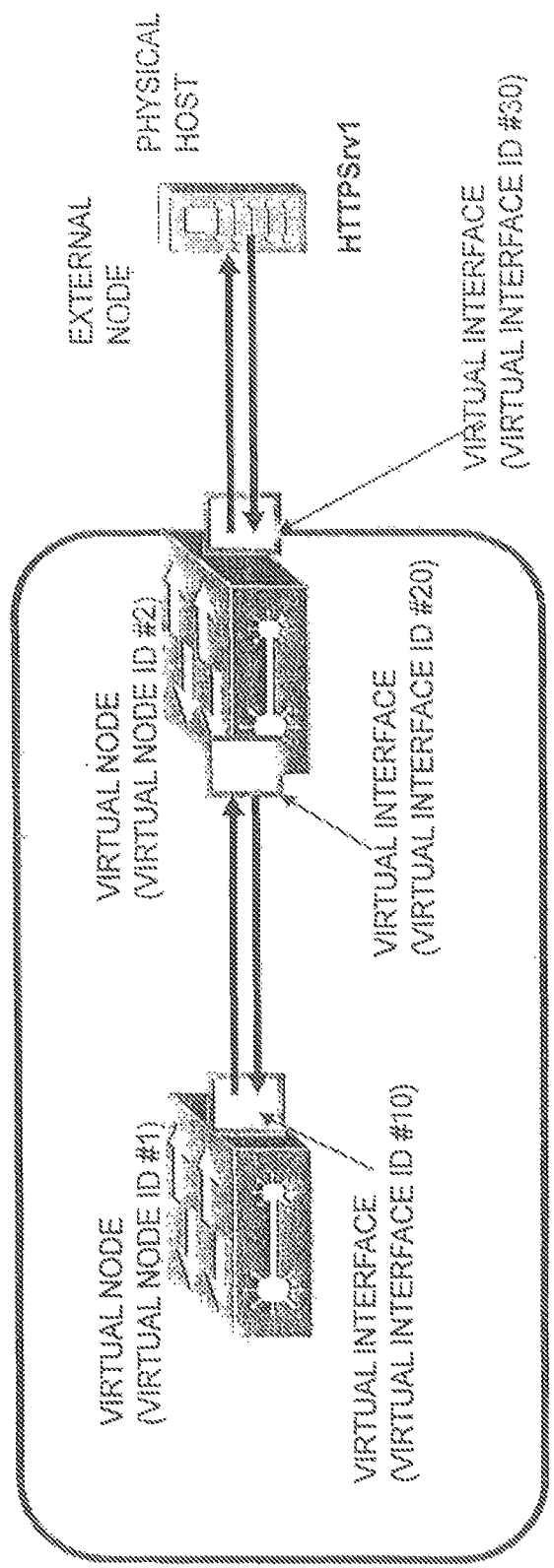
FIG. 9 is a schematic diagram of a virtual network corresponding to the virtual network configuration information in FIG. 8.

FIG. 8 shows an example of the virtual network configuration information stored in the virtual network configuration information storage unit 202. It is indicated that a virtual interface of a virtual node indicated in a KEY field is connected by a virtual interface of a virtual node in a Value field. In the example of FIG. 8, the virtual node of ID #1 is connected to the virtual node of ID #2 by a virtual interface of virtual interface ID #10, and the virtual node of ID #2 is connected to an external node by a virtual interface of virtual interface ID #30. FIG. 9 is a schematic diagram of a virtual network corresponding to the virtual network configuration information in FIG. 8. Based on the virtual network configuration information, the virtual network control unit 212 is able to specify a virtual node ID to the virtual node emulation unit 211, receive a packet, and obtain the results thereof.

FIG. 10 shows an example of the virtual network identifying information indicating an association between the virtual network and characteristics of a packet stored in the virtual network identifying information storage unit 203. In the example of FIG. 10, there is an configuration in which for packet matching conditions indicated in a KEY field, a virtual network to which it should belong, the virtual node ID, and the virtual interface can be uniquely determined. Further, by performing a reverse lookup on the table shown in FIG. 10, a physical switch ID, physical port ID, vlan-tag on a real network to which a packet having a certain virtual network, virtual node ID, and virtual interface can be determined. The conversion operation between the virtual network and the real network described above is called "physical-virtual conversion" hereinafter in the present description. Further, physical node ID, physical port ID, and header information (source MAC address (mac(src)), destination MAC address (mac(dst)), VLAN number (vlan-tag), source IP address (ip(src)), destination IP address (ip(dst)), source layer 4 port number (14port(src)), and destination layer 4 port number (14port(dst)) are shown in the example of FIG. 10, but it is not necessary to use all these pieces of information and it may be configured so that other pieces of header information or packet information can be specified as necessary.

By providing as many the tables shown in FIG. 8 as the number of virtual networks, a plurality of virtual networks can be constructed. Then, by defining packet characteristics for each user and a virtual network that the user is authorized to use using a table as the one shown in FIG. 9 [sic. FIG. 10], a virtual network can be provided to a plurality of users in a form that the network is logically divided.

The virtual network control unit 212 supplies an input packet(s) to the virtual node emulation unit 211, obtains the processing result thereof, and then supplies a physical node that has received this packet and the port number thereof, and a physical node after physical-virtual conversion performed on the packet on which network processing has been performed by the virtual node emulation unit 211, and the output port number thereof, to the path control unit 213.

The path control unit 213 calculates a forwarding path for outputting the packet supplied to the physical node based on physical network topology information stored in the physical topology information storage unit 204 from the physical node after the physical-virtual conversion. For this path calculation, for instance, Dijkstra's shortest path algorithm can be used.

Further, the path control unit 213 stores the result of the path calculation in the shortest path information storage unit 205 as a cache for a predetermined period of time. When performing subsequent path calculations, the path control unit 213 refers to the shortest path stored in the shortest path information storage unit 205 and is able to omit the path calculation processing if the cache remains.

Further, the path control unit 213 stores a pair of the flow and the shortest path information in the set flow forwarding path information storage unit 206 as well. When performing subsequent path calculations, the path control unit 213 is able to use the path information stored in the set flow forwarding path information storage unit 206.

The shortest path information storage unit 205 and the set flow forwarding path information storage unit 206 can be omitted. Further, how much is stored in each path information can be suitably changed according to the purpose and the hardware specifications of this system.

Figure 12:
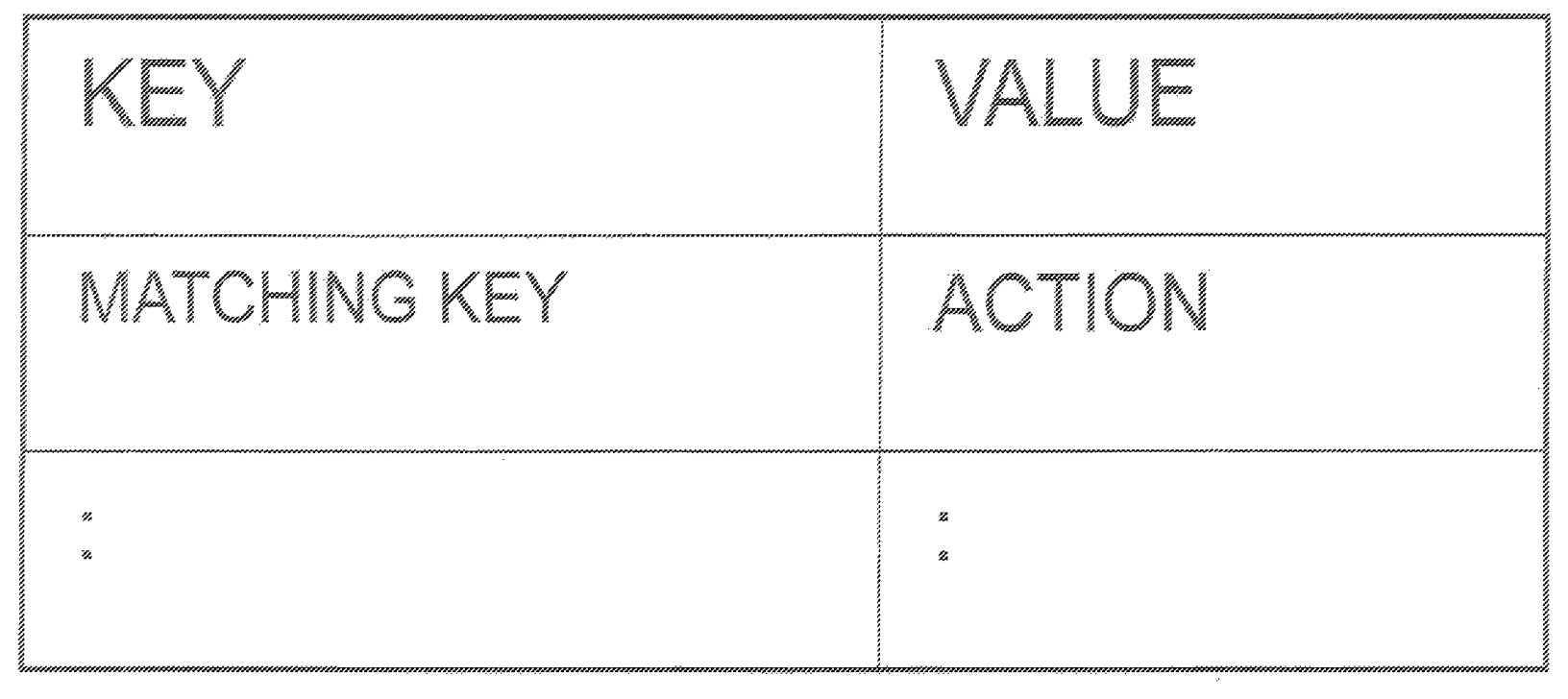

The OpenFlow protocol processing unit 214 instructs each physical node 10 to update the flow table 12 according to the path information calculated by the path control unit 213 as described. FIG. 11 shows an example of a management switch table that the OpenFlow protocol processing unit 214 refers to when performing this processing. FIG. 12 shows an example of a flow entry.

Figure 5:
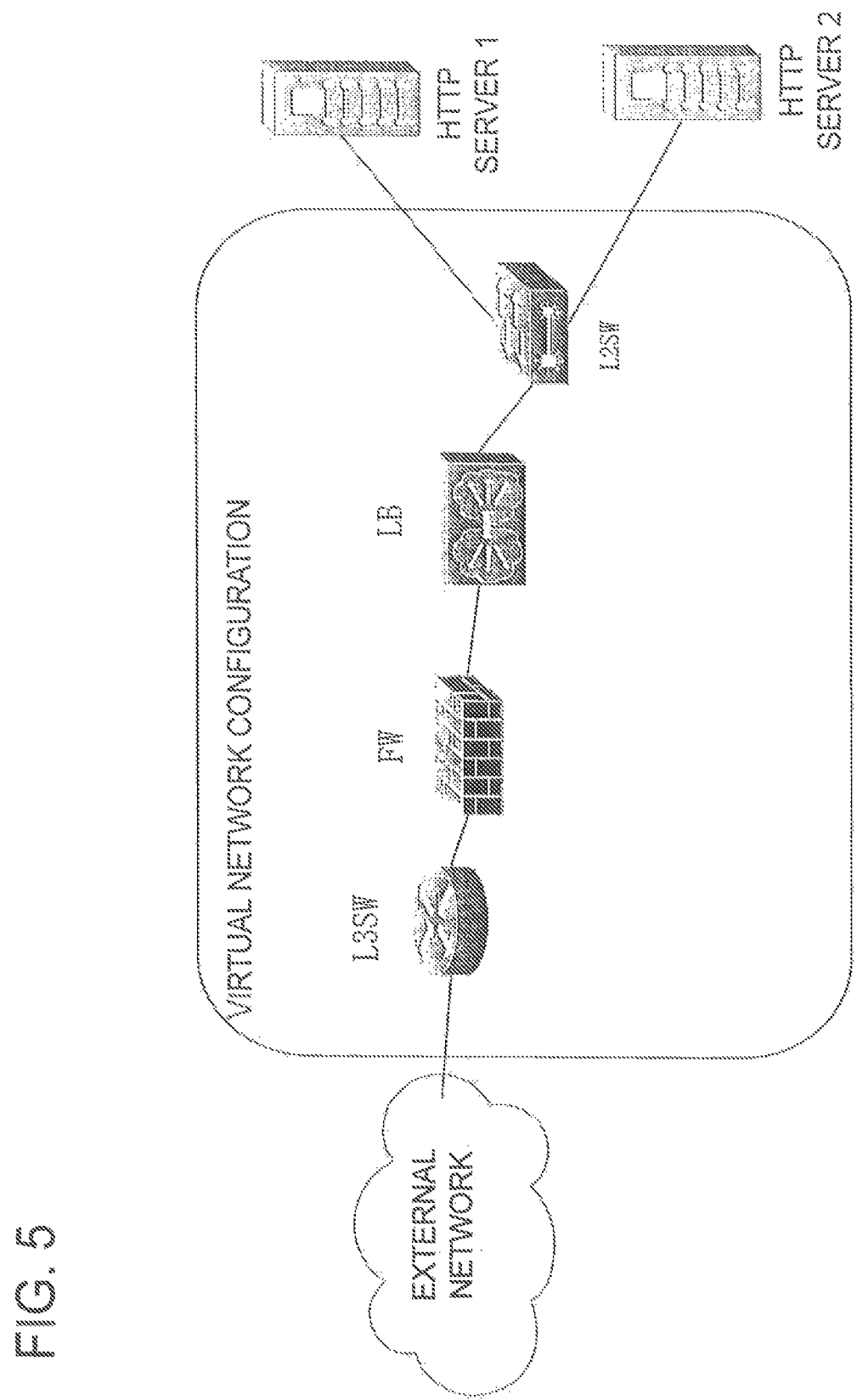
FIG. 5 is a drawing showing the configuration of a virtual network constructed by the control server of the first exemplary embodiment of the present invention.
Figure 13:
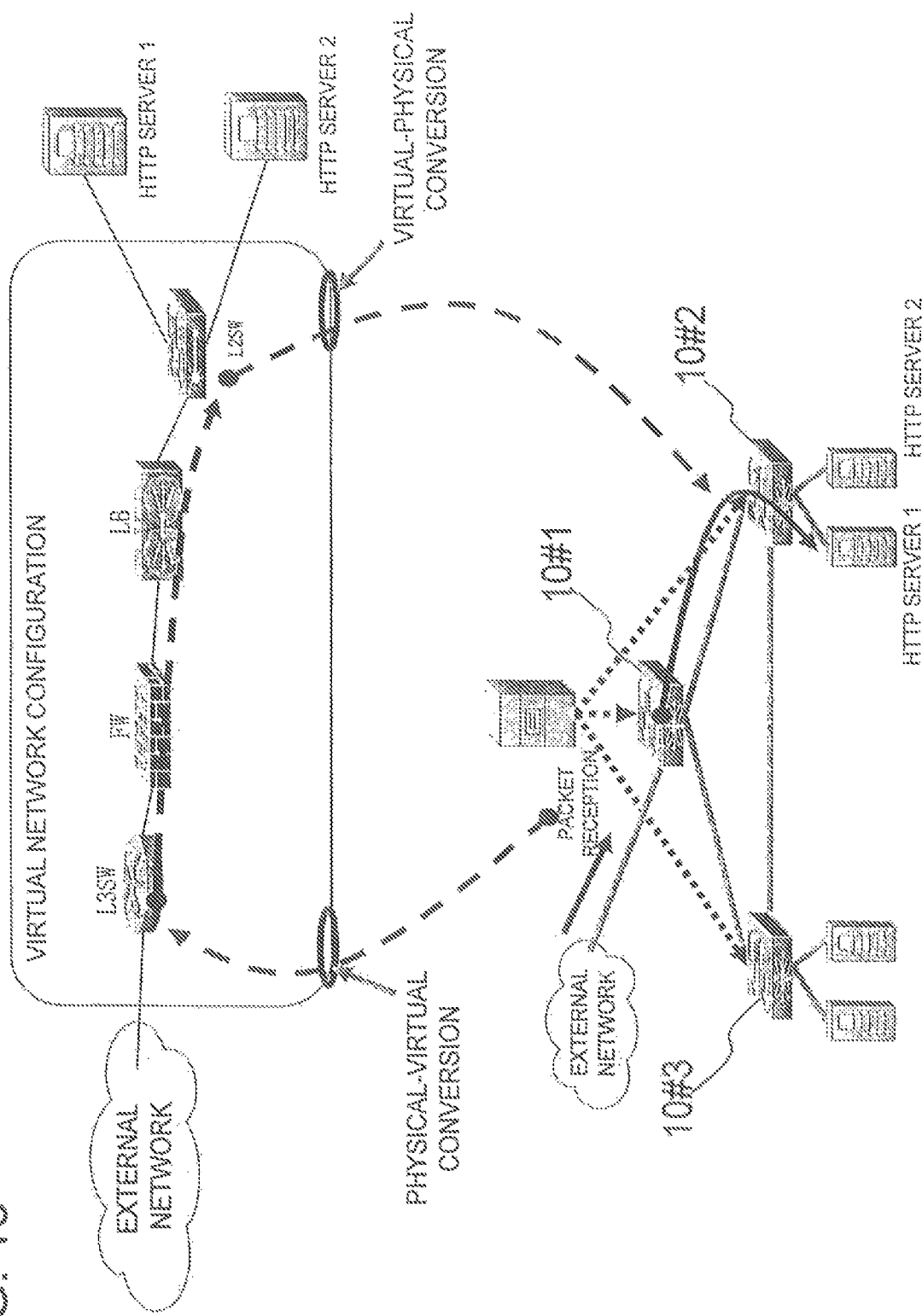
FIG. 13 is a drawing showing a correspondence relation between the configuration in FIG. 2 and the virtual network in FIG. 5.

FIG. 13 is a drawing showing the correspondence relation between the virtual network shown in FIG. 5 and the real network configuration shown in FIG. 2. For instance, when the physical node 10 #1 in FIG. 13 receives a packet from the port connected to the external network, the physical node 10 #1 will issue an inquiry to the OpenFlow protocol processing unit 214 of the control server 20 if there is no entry matching this packet in the flow table 12. The OpenFlow protocol processing unit 214 adds an ID of the physical node 10 #1 and the port number to this inquiry and forwards it to the virtual network control unit 212. The virtual network control unit 212 performs physical-virtual conversion on the received packet by referring to the virtual network configuration information storage unit 202 and the virtual network identifying information storage unit 203 and suitably performs network processing using the virtual node emulation unit 211 assuming that the packet is supplied to a virtual network indicated in the upper part of FIG. 11. Then, the virtual network control unit 212 performs physical-virtual conversion again on the processing result from the virtual node emulation unit 211, and supplies the result to the path control unit 213. Here, for instance, if a result that the packet should be outputted from a port of the physical node 10 #2 connected to an HTTP server 1 is obtained from the result of virtual-physical conversion on the output of the virtual node emulation unit 211, and the path control unit 213 calculates that a path from the physical node 10 #1 to the physical node 10 #2 is the shortest, the OpenFlow protocol processing unit 214 controls so that the packet is outputted from the physical port corresponding to the virtual interface of the physical node ID 10 #2 and instructs the physical node 10 #1 and the physical node 10 #2 on the path to update the flow tables so that subsequent packets will be similarly processed.

As described, network processing equivalent to the virtual network in the upper part of FIG. 13 is realized by the combination of the physical nodes 10 #1 to 10 #3 and the control server 20 shown in the lower part of FIG. 13. One of the benefits of this configuration is that, even if the configurations of the physical node and HTTP server are physically changed, this can be addressed by modifying the table used in physical-virtual conversion and illustrated in FIG. 10, and maintenance property will improve. For instance, when the physical node 10 #1 shown in the lower part of FIG. 13 is replaced, this can be addressed by modifying the table used in physical-virtual conversion and illustrated in FIG. 10 and does not influence the configuration of the virtual network (refer to the upper part of FIG. 13) visible to a user.

Next, with reference to FIGS. 14 to 17, a sequence of the operation of the present exemplary embodiment is organized and described. In the explanation below, it is assumed that the physical node #1 has received a new packet from a user terminal connected to the external network. Further, to simplify the description, it is assumed that one virtual router is provided as a virtual node in the virtual network.

Figure 14:
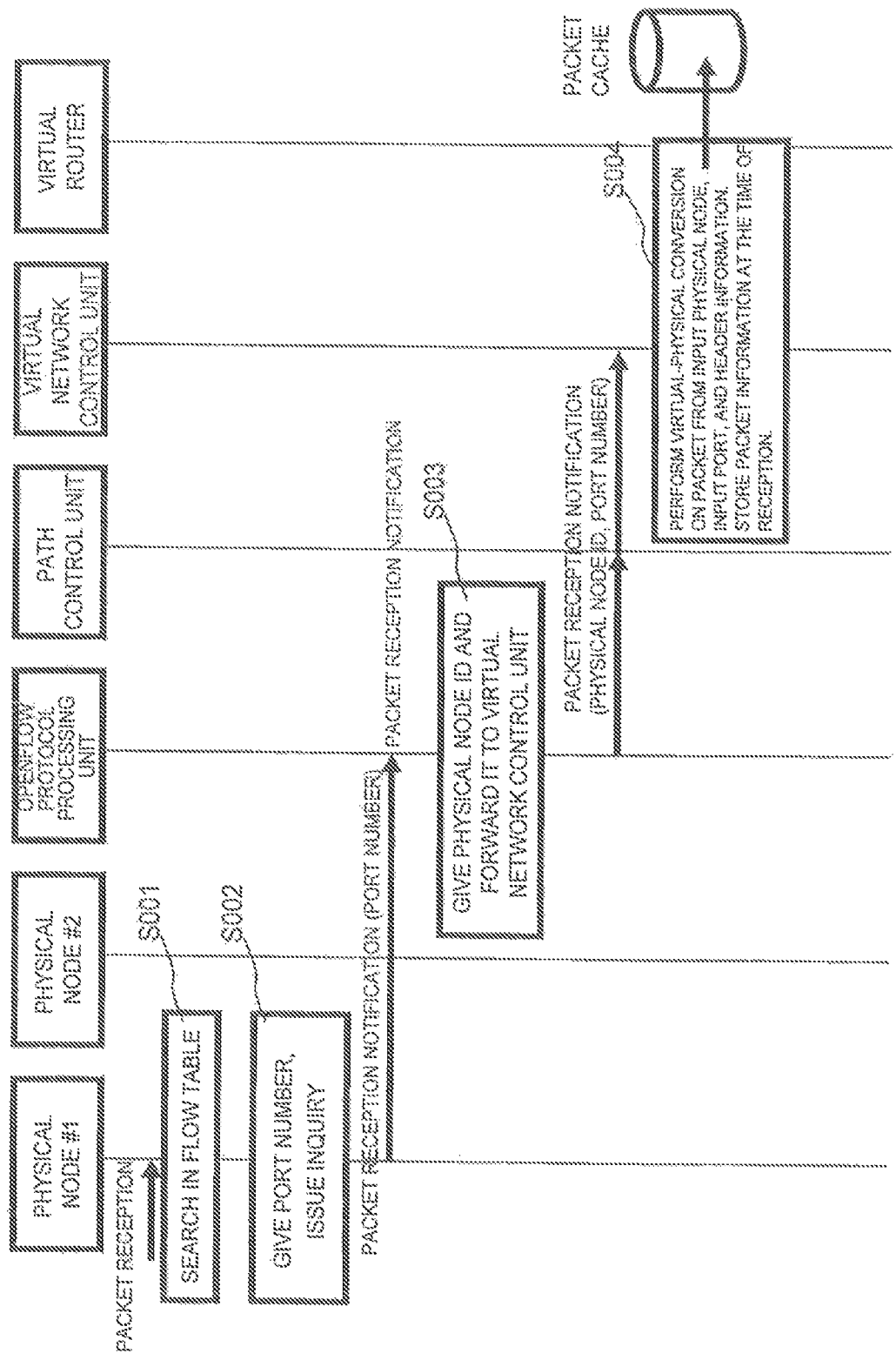
FIG. 14 is a sequence diagram for explaining the operation of the first exemplary embodiment of the present invention.

As shown in FIG. 14, upon receiving a packet, the physical node #1 searches for an entry having a matching key that matches this packet in the flow table 12 (step S001).

Here, it is assumed that this packet is the first packet and no entry corresponding to the received packet is registered in the flow table of the physical node #1. Therefore, the physical node #1 issues an inquiry with the port number (input port number) that received the packet and the packet to the control server 20, and requests the control server to generate and transmit a flow entry (step S002; packet receipt notification (Packet-In)).

Upon receiving the packet receipt notification (Packet-In), the OpenFlow protocol processing unit 214 of the control server 20 adds the source physical node ID (input physical node) of the packet receipt notification (Packet-In) and forwards the packet to the virtual network control unit 212 (step S003). Note that the physical node ID can be derived from the management switch table shown in FIG. 11 or a security channel identifier (SecChan identifier) that received this packet.

The virtual network control unit 212 stores the received packet in the packet cache 215 and performs virtual-physical conversion on the packet by referring to the virtual network identifying information illustrated in FIG. 10 using the physical node ID (input physical node) of the packet source, the input port number, and header information (step S004). Note that the packet cache 215 may be omitted, and in this case the step in which the received packet is stored in the packet cache 215 is omitted.

Figure 15:
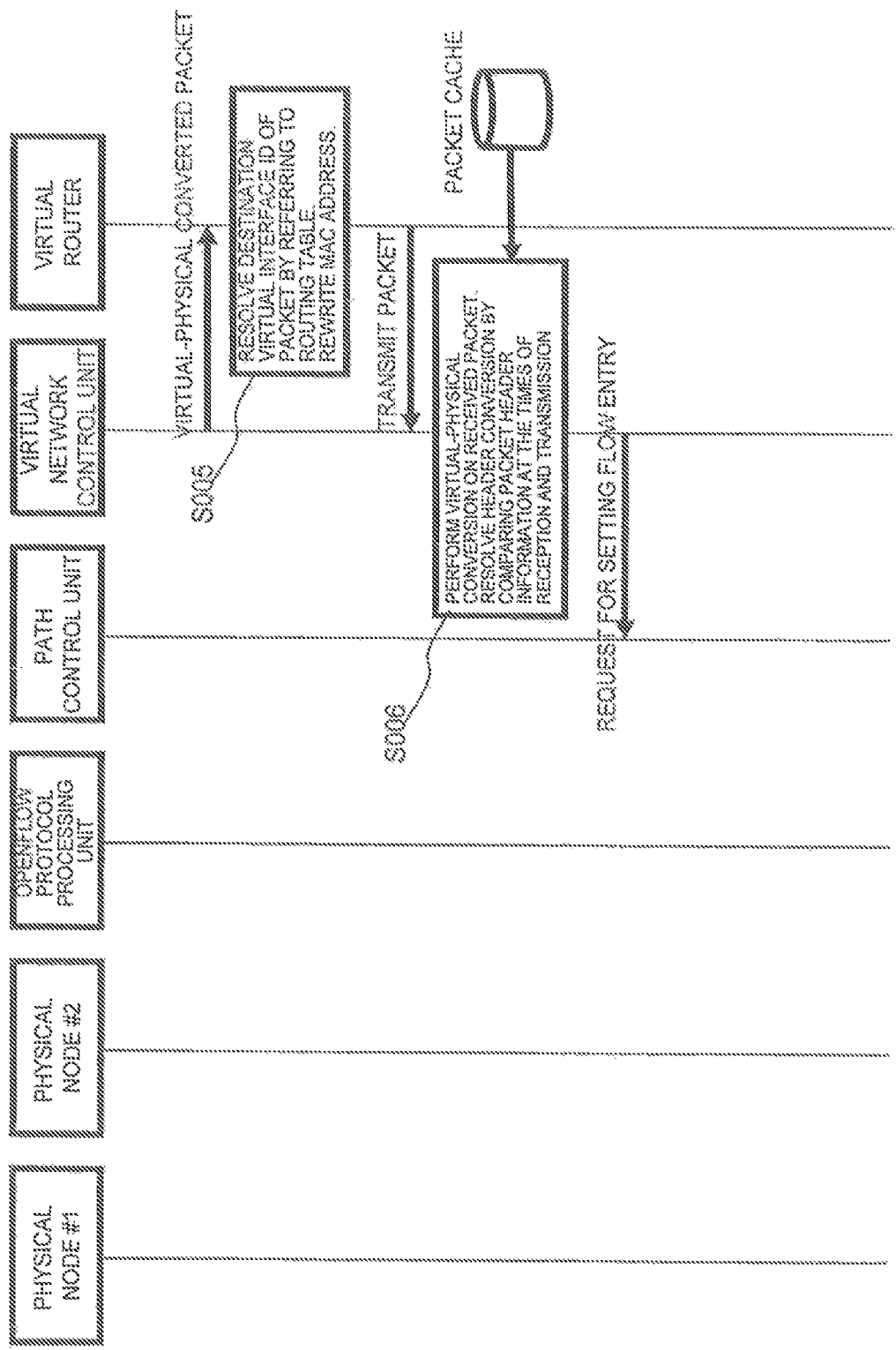
FIG. 15 is a sequence diagram for explaining the operation of the first exemplary embodiment of the present invention.

Next, as shown in FIG. 15, when the virtual network control unit 212 supplies the packet after the virtual-physical conversion to the virtual router, the virtual router resolves the virtual interface ID of the packet source by referring to the routing table illustrated in FIG. 7A and transmits the packet whose MAC address has been rewritten (step S005).

The virtual network control unit 212 resolves the physical node ID that outputs the packet and the physical port ID thereof by performing a reverse lookup on the virtual network identifying information illustrated in FIG. 10 using the virtual interface ID of the transmitted packet, and resolves the contents of header conversion instructed to this physical node by comparing the packet stored in the packet cache 215 at the time of the reception and the header information of the transmitted packet (step S006). Further, if the packet cache 215 is not provided in the virtual network control unit 212, a solution such as a method for receiving a matching packet from the path control unit 213 may be suitably employed.

Next, the virtual network control unit 212 requests setting of a flow entry that includes the input physical node, the input port number, the header information, the resolved physical node ID and the physical port ID outputting the packet, and the header conversion contents.

Figure 16:
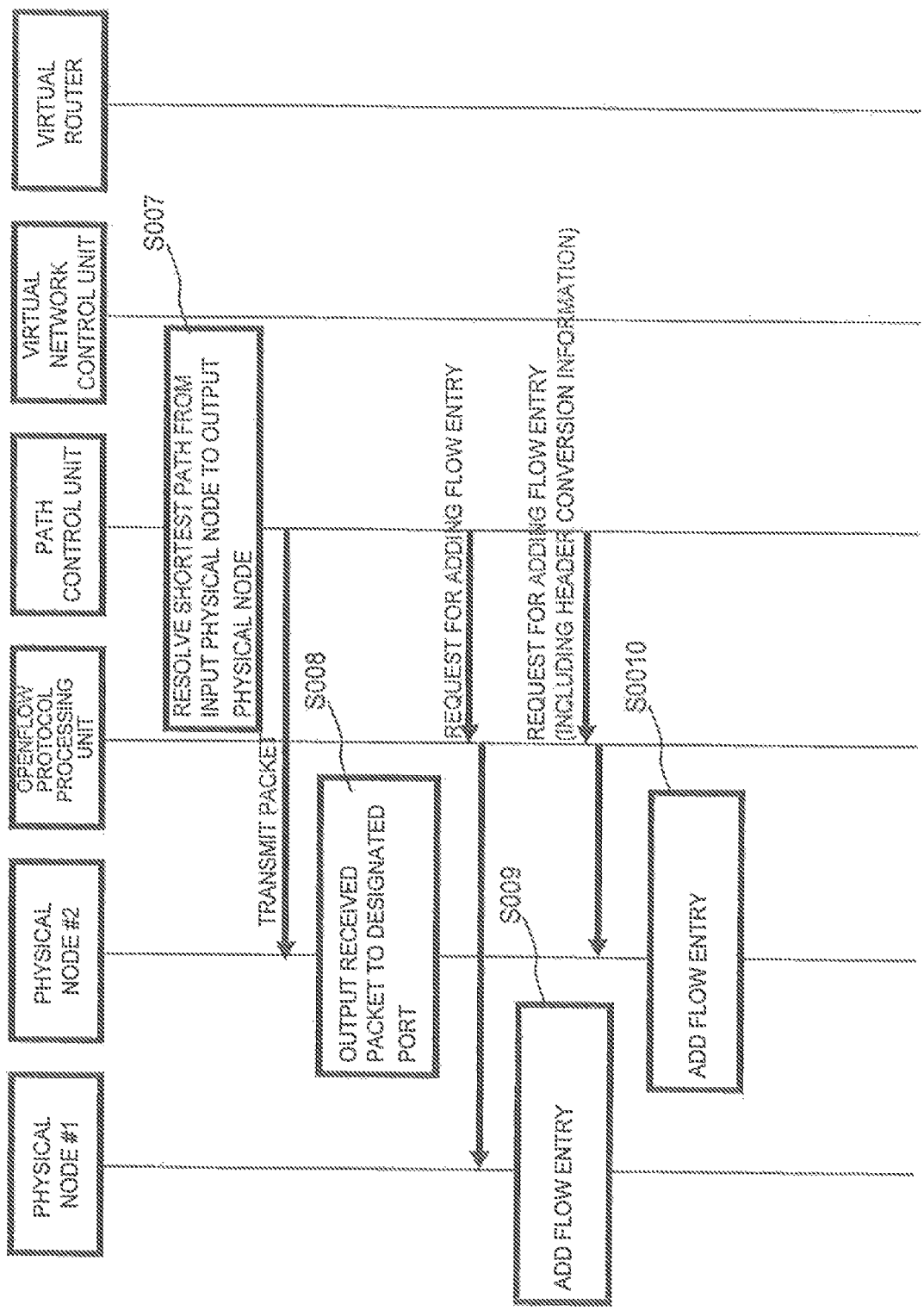
FIG. 16 is a sequence diagram for explaining the operation of the first exemplary embodiment of the present invention.

Next, as shown in FIG. 16, the path control unit 213 that has received the request for setting the flow entry resolves the shortest path from the input physical node to the output physical node (step S007). The path control unit 213 transmits the received packet to the physical node #2, instructs the physical node #2 to output the packet from a designated port, and requests the OpenFlow protocol processing unit 214 to add a flow entry that realizes the resolved shortest path.

The physical node #2 outputs a received packet from the designated port according to the instruction from the path control unit 213 (step S008). Further, at this time, the OpenFlow protocol processing unit 214 may have the physical node #2 execute an action of obtaining an IP DA (Internet Protocol Destination Address) from the header of the received packet, transmitting an ARP request to ports other than the port that received the received packet, and obtaining a corresponding MAC DA.

Further, the OpenFlow protocol processing unit 214 creates a flow entry to each physical node corresponding to the specified shortest path and transmits the flow entries to the physical nodes #1 and #2 (flow entry adding request; FlowMod (Add)). At this time, the OpenFlow protocol processing unit 214 sends a flow entry defining an action of converting the header to the physical node #2 as well.

The physical nodes #1 and #2 add the flow entries to the flow tables 12 according to the instruction from the OpenFlow protocol processing unit 214 (step S009).

Then, as shown in FIG. 17, since the set flow entry is detected in a search in the flow table 12 (step S101), the physical node #1 successively forwards subsequent packets to the physical node #2 without issuing an inquiry to the control server 20 (step S102).

Similarly, since the set flow entry is detected in a search in the flow table 12 (step S103), the physical node #2 successively outputs the packets received from the physical node #1 from the designated port (step S104).

Although this is omitted in FIGS. 14 to 17, the same processing is performed in a flow so which the physical nodes #1 and #2 in FIGS. 14 to 17 are switched when a response to the packet is transmitted from the packet output destination of the physical node #2.

In the exemplary embodiment described above, the explanation was given using an example in which a virtual router is provided as a virtual node, however, the firewall (FW) and the load balancer (LB) on the virtual network shown in FIG. 5 can be similarly realized by defining the behavior of the physical node.

For instance, when the virtual node emulation unit 211 is operated as a firewall according to a firewall policy of performing filtering operation by referring to the header information of a particular layer, a function equivalent to the firewall on the virtual network can be realized by setting an action of having the physical node receive the packet outputted from the virtual router and drop a corresponding packet based on the result thereof.

Similarly, for instance, a function equivalent to the load balancer on the virtual network can be realized by setting an action of supplying an output from the firewall to the virtual node emulation unit 211 that operates according to a predetermined load balance policy and switching the destination of the packet based on the result thereof.

The exemplary embodiment of the present invention has been described above, however, the present invention is not limited to the above exemplary embodiment and further modifications, replacements, and adjustments can be added within the scope of the basic technological concept of the present invention. For instance, the OpenFlow switch is used as the physical node and the OpenFlow protocol is used in the communication between the physical node and the control server in the exemplary embodiment described above, however, the present invention is not limited to the example above and any switch or protocol having the same functions can be used. For instance, the physical node can be realized by a router on an IP network or an MPLS switch on an MPLS (Multi-Protocol Label Switching) network, in addition to the OpenFlow switch.

It should be noted that within the entire disclosure (including the claims) and based on the fundamental technical concept, modifications and/or adjustment of the disclosed exemplary embodiments or examples may be done. Also various combination and selection of the various disclosed elements may be done within the scope of the claims of the present invention. That is, variations or modifications that may be done by the person of ordinary skill in the art based on the entire disclosure and technical concept including the claims may be included.

EXPLANATIONS OF SYMBOLS 10, 10 #1, 10 #2, 10 #3: physical node
11: server communication unit
12: flow table
13: control unit
20: control server
30: external node
201: virtual node object storage unit
202: first storage unit (virtual network configuration information storage unit)
203: second storage unit (virtual network identifying information storage unit)
204: physical topology information storage unit
205: shortest path information storage unit
206: set flow forwarding path information storage unit
207: flow entry storage unit
208: management switch information storage unit
210: control unit
211: virtual node emulation unit
212: virtual network control unit
213: path control unit
214: OpenFlow protocol processing unit
215: packet cache

The invention claimed is:

1. A control apparatus, comprising:
memory configured to store program instructions; and
a processor configured to execute the program instructions to:
identify a rule for a virtual network including a plurality of virtual nodes, wherein each of the plurality of virtual nodes includes a virtual network function of a network appliance, and the rule specifies a conversion operation between information of the virtual network and information of a physical network;
create control information to emulate the virtual network function to perform communication between the plurality of virtual nodes, wherein the control information includes an action field that indicates processing of a packet communicating in the physical network based on the rule, and a matching field to identify the processed packet; and
send the control information to a physical node processing the packet corresponding to the virtual network function,
wherein the virtual network function of the network appliance comprises a virtual load balancing function, and at least one of the plurality of virtual nodes has the virtual load balancing function to distribute the packet.

2. The control apparatus according to claim 1, wherein the processor is further configured to execute program instructions to identify the virtual network corresponding to a characteristic of the packet.

3. The control apparatus according to claim 1, wherein the virtual network corresponds to a user.

4. The control apparatus according to claim 3, wherein the user is authorized to change a configuration of the virtual network.

5. The control apparatus according to claim 1, wherein the virtual network function of the network appliance comprises a virtual switching function, and at least one of the plurality of the virtual nodes has the virtual switching function to forward the packet.

6. The control apparatus according to claim 1, wherein the virtual network function of the network appliance comprises a virtual fire wall function, and at least one of the plurality of virtual nodes has the virtual fire wall function to drop the packet.

7. A network system, comprising:
a physical node; and
a control apparatus configured to control the physical node,
wherein the control apparatus further comprises:
memory configured to store program instructions; and
a processor configured to execute the program instructions to:
identify a rule for a virtual network including a plurality of virtual nodes, wherein each of the virtual nodes includes a network function of a network appliance, and the rule specifies a conversion operation between information of the virtual network and a physical network;
create control information to emulate the virtual network function to perform communication between the plurality of virtual nodes, wherein the control information includes an action field that indicates processing of a packet communicating in the physical network based on the rule, and a matching field to identify the processed packet; and
send the control information to the physical node processing the packet corresponding to the virtual network function,
wherein the virtual network function of the network appliance comprises a virtual load balancing function, and at least one of the plurality of virtual nodes has the virtual load balancing function to distribute the packet.

8. The network system according to claim 7, wherein the processor is further configured to execute program instructions to identify the virtual network corresponding to a characteristic of the packet.

9. The network system according to claim 7, wherein the virtual network corresponds to a user.

10. The network system according to claim 9, wherein the user is authorized to change a configuration of the virtual network.

11. The network system according to claim 7, wherein the virtual network function of the network appliance comprises a virtual switching function, and at least one of the plurality of virtual nodes has the virtual switching function to forward the packet.

12. The network system according to claim 7, wherein the virtual network function of the network appliance comprises a virtual fire wall function, and at least one of the plurality of virtual nodes has the virtual fire wall function to drop the packet.

13. A control method of network communications, comprising:
  identifying a rule for a virtual network including a plurality of virtual nodes, wherein each of the plurality of virtual nodes includes a virtual network function of a network appliance, the rule specifies a conversion operation between information of the virtual network and information of a physical network;
  creating control information to emulate the virtual network function to perform communication between the plurality of virtual nodes, where the control information includes an action field that indicates processing of a packet communicating in the physical network based on the rule, and a matching field to identify the processed packet; and
  sending the control information to a physical node processing the packet corresponding to the virtual network function,
  wherein the virtual network function of the network appliance comprises a virtual load balancing function, and at least one of the plurality of virtual nodes has the virtual load balancing function to distribute the packet.

14. The control method of network communications according to claim 13, further comprising:
  identifying the virtual network corresponding to a characteristic of the packet.

15. The control method of network communications according to claim 13, wherein the virtual network corresponds to a user.

16. The control method of network communications according to claim 15, wherein the user is authorized to change a configuration of the virtual network.

17. The control method of network communications according to claim 13, wherein the virtual network function of the network appliance comprises a virtual switching function, and at least one of the plurality of virtual nodes has the virtual switching function to forward the packet.

18. The control method of network communications according to claim 13, wherein the virtual network function of the network appliance comprises a virtual fire wall function, and at least one of the plurality of virtual nodes has the virtual fire wall function to drop the packet.

* * * * *